United States Patent [19]

Sweatman

[11] 4,275,788
[45] Jun. 30, 1981

[54] METHOD OF PLUGGING A WELL

[75] Inventor: Ronald E. Sweatman, Fountain Valley, Calif.

[73] Assignee: BJ-Hughes Inc., Long Beach, Calif.

[21] Appl. No.: 115,870

[22] Filed: Jan. 28, 1980

[51] Int. Cl.³ .............................................. E21B 33/38
[52] U.S. Cl. ..................................... 166/292; 166/285; 166/294; 166/295
[58] Field of Search ................ 166/253, 285, 291, 292

[56] References Cited

U.S. PATENT DOCUMENTS

| | | | |
|---|---|---|---|
| 2,219,325 | 10/1940 | Maness | 166/292 X |
| 2,495,352 | 1/1950 | Smith | 166/291 X |
| 2,743,779 | 5/1956 | Brown | 166/291 X |
| 3,011,547 | 12/1961 | Holbert et al. | 166/253 |
| 3,171,481 | 3/1965 | Brown | 166/291 |
| 3,502,148 | 3/1970 | Slagle et al. | 166/292 |

*Primary Examiner*—James A. Leppink
*Assistant Examiner*—George A. Suchfield
*Attorney, Agent, or Firm*—Robert A. Felsman

[57] ABSTRACT

A method for forming a plug in a well bore by establishing a two-phase system within the well bore. The two-phase system includes a less dense phase which bears against the upper surface of a higher density phase to provide an interface between the two phases that is positioned at a desired location in the well-bore for formation of a plug. A hardenable plug material is injected at the interface between the two phases with the plug material having a density which is intermediate the densities of the less dense and more dense phases. The plug material is then permitted to harden to form a bond within the well bore. In the formation of the plug, the plug material floats on the more dense phase with the plug material being squeezed between the less dense and the higher density phases. Thus, the plug material is compressed and is also forced laterally into contact with the surface of the well bore to bond more securely to the well-bore surface during hardening of the plug material.

The two-phase system within the well bore may be made up of a more dense liquid and a less dense liquid; the latter floats on the more dense liquid and an interface is formed between the two liquids. Also, the two-phase system may be made up of a more dense liquid and a pressurized gas which contacts the upper surface of the liquid to form a gas-liquid interface. In either event, injection of the hardenable plug material at the interface between the two phases produces squeezing of the plug material between the two phases during hardening of the plug material.

20 Claims, 8 Drawing Figures

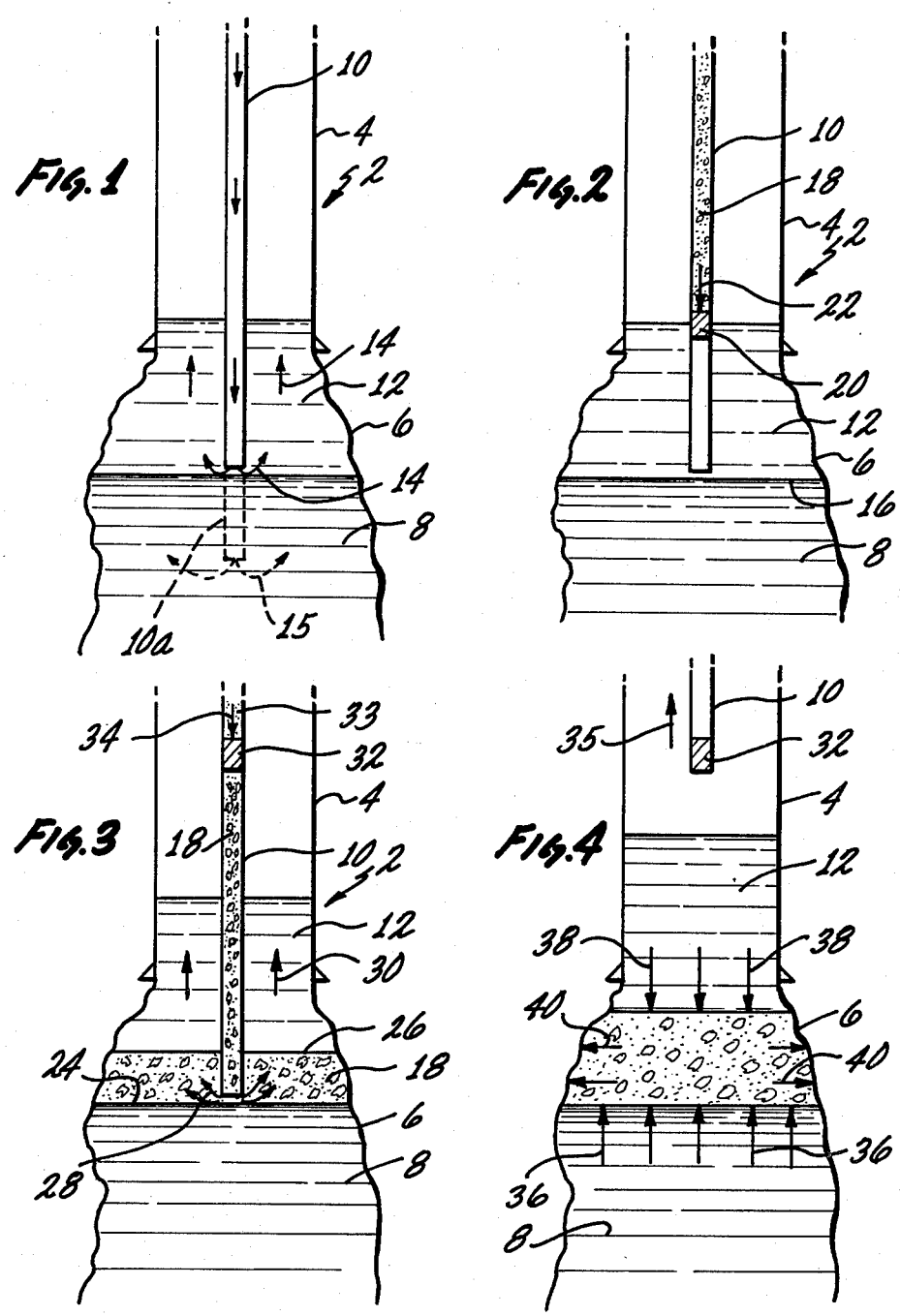

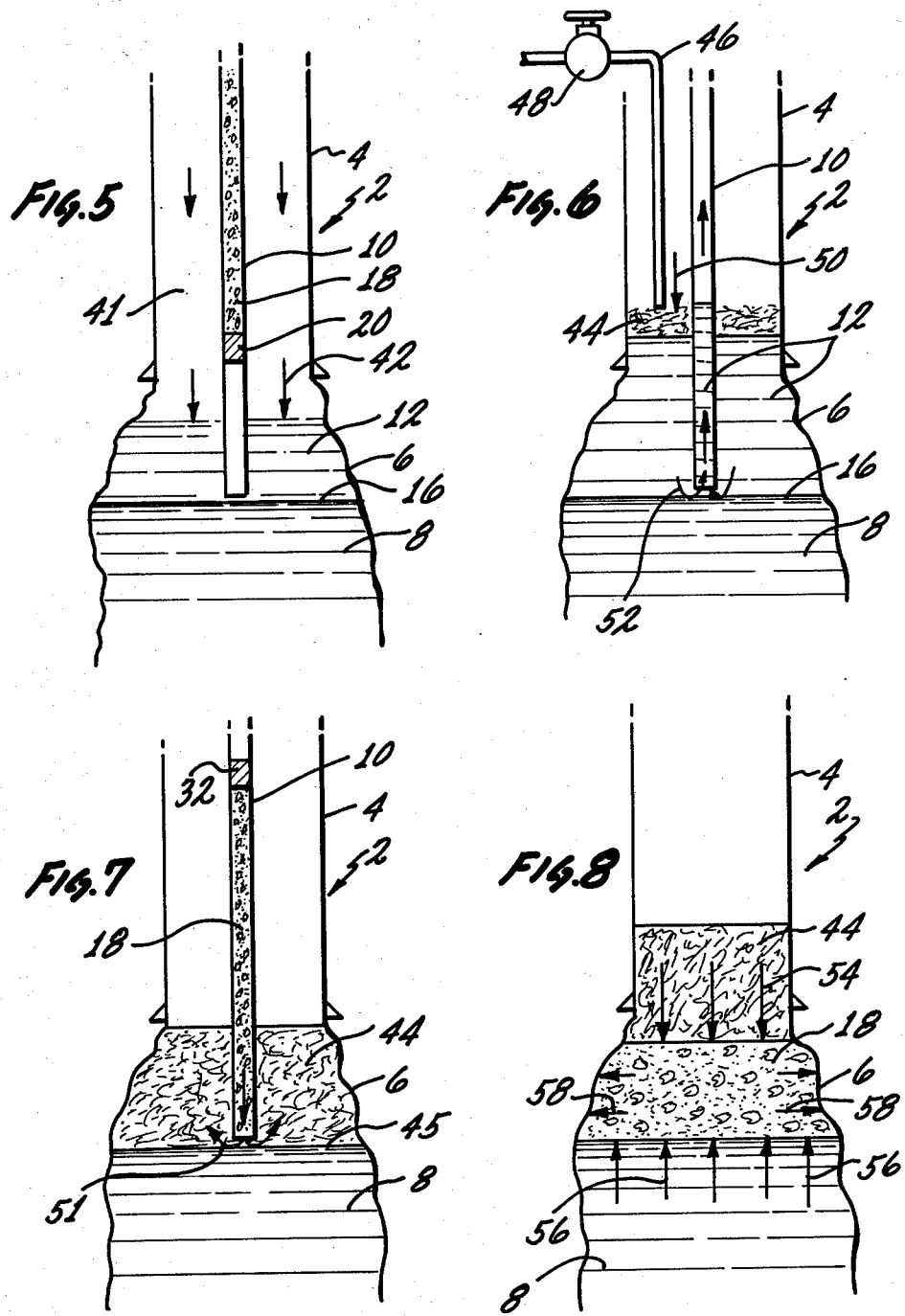

METHOD OF PLUGGING A WELL

BACKGROUND OF THE INVENTION

During various well-working operations, it is frequently necessary to form a hard set plug in the well bore. When the well bore is either full or partially full of a liquid, it is difficult to form the plug at the desired location within the well bore.

As noted in U.S. Pat. No. 3,447,608 to Fry et al., in setting a cement plug within an open hole which contains mud, the more dense plug material may fall through the mud into the lower part of the bore hole. In attempts to solve this problem by lowering the density of the cement slurry used as the plug material, the plug which was formed lacked sufficient compressive strength due to the low-density slurry used in forming the plug.

In attempting to deal with the problem of placing a plug within a well bore which contains liquid, the Frey et al., patent utilizes a temporary plug which is made of low-density material. The low-density temporary plug has a density slightly greater than the mud and is suspended in the drilling mud within the bore hole. After setting of the temporary plug material, cement is then pumped into the bore hole in contact with the temporary plug which supports the cement as it hardens to form a permanent plug.

The problem of forming a plug within a well bore which contains liquid is also dealt with in U.S. Pat. No. 3,844,351 to Sutton et al. In the procedure of Sutton et al., the plug material is formed of a lightweight cement which preferably has a density of not more than about 80 pounds per cubic foot. The plug material used by Sutton et al., contains a foam stabilizer, in addition to water and dry cement, such that air may be entrained within the cement composition in the desired amount to lower the density of the cement composition. The aerated cement composition is then placed on the surface of the liquid within the well bore with the cement composition being buoyed up by the liquid with air at atmospheric pressure above the surface of the cement composition.

In the prior art procedures exemplified by the Fry et al., and Sutton et al., patents, the plug material is positioned at the surface of a liquid within the well bore. However, it is frequently desirable to place a plug at a location which is below the surface level of a liquid within a well bore. For example, due to the porosity of the formation and liquid pressure within the formation, a liquid may rise within a well bore to a given level. Under these circumstances, the prior art procedures of the Fry et al., and the Sutton et al., patents would be of no avail in forming the plug at the desired location since the desired location is below the surface level of the liquid within the well bore. The prior art of Fry et al., patent does not form a gravity stratification of a plug between a lower, more dense phase and an upper, less dense phase that compresses the plug.

There is a need for a procedure in which a plug may be formed within a well bore at a level that is below the surface level of liquid within the well bore. Additionally, as referred to in the Fry et al., patent, there is a need for a procedure for forming a plug within a well bore such that the plug has greater strength and forms a better bond with the surface of the well bore.

SUMMARY OF THE INVENTION

The present invention provides a solution to the aforementioned problems with a method for forming a hard set plug within a well bore at a location which is below the surface level of liquid standing in the well bore. Additionally, the present method may be used to form a plug which has a greater strength and is more securely bonded to the surface of the well bore.

In practicing the invention, a two-phase system is established within a well bore; in which a less dense phase bears against the upper surface of a more dense phase to provide an interface between the two phases. The interface is positioned at the desired location for formation of a plug within the well bore.

Where there is standing liquid within a well bore, and it is desired to form a plug at a location below the surface level of the standing liquid, a liquid having a density less than that of the standing liquid may be circulated within the well bore. In circulating the less dense liquid, a portion of the more dense liquid may be entrained and removed by the less dense liquid to position the interface between the less dense and more dense liquid at the desired location for formation of the plug.

Conversely, in forming an interface within a well bore for placement of the plug, a more dense liquid may be injected below the surface of a less dense standing liquid within the well bore. The more dense liquid displaces a portion of the less dense liquid to form an interface between the two liquids.

As more of the more dense liquid is injected, the less dense liquid continues to be displaced with the interface between the two liquids moving upwardly within the well bore. When the interface has moved to the desired location for placement of the plug, the plug material may be then introduced at the interface as described.

After positioning the interface between the less dense phase and more dense phase at the desired location within the well bore, a plug material may be injected into the well bore at the interface. The density of the plug material is preferably intermediate that of the two phases within the well bore with the more dense phase below the plug material being more dense than the plug material and the less dense phase above the plug material being less dense than the plug material. Thus, the plug material floats on the higher density phase within the well bore and the plug material is squeezed between the less dense and more dense phases. The less dense phase positioned above the plug material may exert a downward force against the plug material such that the plug material is forced laterally into contact with the surface of the well bore. The squeezing of the plug material by the less dense and more dense phases during hardening of the plug material within the well bore compresses the plug material. The compression of the plug material during hardening provides a plug which has increased strength. Additionally, the lateral forces exerted by the plug material against the surface of the well bore during hardening provide better bonding between the plug and the surface of the well bore.

In carrying out the present method, a pipe may be placed within the well bore, with the pipe having an open lower end positioned at the desired location for formation of the plug. A less dense liquid having a density less than that of a more dense liquid standing within the well bore may then be circulated within the well bore. The less dense liquid may be forced downwardly through the pipe, out of the open end of the pipe, and then upwardly through the annulus between the pipe and the interior surface of the well bore. After circulating the less dense liquid to establish an interface between the more dense and less dense liquids which is adjacent to the open lower end of the pipe, a hardenable plug material may then be forced through the pipe with the plug material being discharged from the open end of the pipe and injected into the well at the interface between the higher density and less dense liquids. The plug material which is injected at the interface is then squeezed between the more dense and less dense liquids, as described, with the plug material having a density which is intermediate that of the more dense and less dense liquids. In order to squeeze the plug material, pressure may be applied to the upper less dense phase which bears against the plug material. The plug material is not compressed to increase the density more than the more dense, lower phase, except when the bottom portion of an aerated cement or other plug material is set hard enough to allow the upper, unset portion to be compressed to a very dense material to form a superior strength plug.

In using a pipe positioned within the well bore to form a plug, the less dense liquid may be circulated within the well bore by forcing the liquid downwardly through the annular space between the pipe exterior and the interior of the well bore. The less dense liquid may then be returned by flowing upwardly through the pipe.

In using a two-phase system within a well bore to form a plug with injection of plug material at the interface between the two phases, the lower phase may be a liquid and the upper phase may be a pressurized gas. In establishing a gas-liquid interface at a desired location within the well bore for formation of a plug, a less dense liquid may be circulated within the well, as previously described, with the less dense liquid having a density which is less than that of the lower phase, or more dense liquid, within the well. After forming an interface between the more dense and less dense liquids at a desired location for formation of a plug by entraining and removing a portion of the more dense liquid with the less dense liquid, the less dense liquid may be displaced by a pressurized gas. The displacement of the less dense liquid by pressurized gas produces a gas-liquid interface at the desired location within the well bore for formation of a plug. The plug material may then be injected at the interface, with the plug material having a density which is intermediate that of the two phases. The injected plug material may then be squeezed between the lower-phase liquid, upon which the plug material floats, as the pressurized gas bears against the upper surface of the plug material. As described, this results in the formation of a compressed plug having improved adherence to the surface of the well bore.

The present method is useful in forming a plug within a well bore which contains a well liquid that is present due to the seepage of liquid from the formation into the well bore. Further, the present method may be used in forming a plug within a well bore that is dry and does not contain liquid. In this instance, a more dense phase may be intentionally introduced into the well bore. Following this, a less dense phase may be intentionally introduced into the well bore above the more dense phase to establish an interface between the phases at the desired location for formation of a plug. At this point, a hardenable plug material having a density that is intermediate the densities of the two phases may be injected into the well bore at the interface, as described previously, for forming a plug within the well bore.

Plugs which are formed in accordance with the present invention have unique physical characteristics. By compressing the plug material as it undergoes hardening, the plug material sets under stress that squeezes out contaminants to produce a plug which has increased strength. Additionally, by compressing the plug material during hardening, the plug material is forced laterally outward into contact with the inner surface of the well bore. This provides a better bond between the plug and the surface of the well bore in contact with the plug. It may also be possible to control the amount of plug densification by controlling the hydrostatic pressure of the less dense liquid or the gas pressure.

Those skilled in the art will realize upon review of the drawings and the Detailed Description, that the invention as defined by the claims may be employed in a variety of ways which may differ from those specifically described here, as well as for purposes other than those defined.

THE DRAWINGS

To illustrate a preferred embodiment of the invention, reference is made to the drawings, in which:

FIG. 1 is a vertical view taken through a well bore having a first liquid therein, with a less dense liquid being circulated within the well bore above the first liquid, or with a more dense liquid being injected beneath the surface of the first liquid as indicated in phantom line drawing;

FIG. 2 is a vertical view through a well bore, similar to FIG. 1, illustrating a more dense liquid within the well bore, a less dense liquid above the more dense liquid with an interface between the two liquids, and a pipe within the well bore, with its open lower end positioned adjacent to the interface as a hardenable plug material moves downwardly through the pipe;

FIG. 3 is a vertical view through a well bore, similar to FIGS. 1 and 2, showing a cementitious plug material positioned between the more dense liquid and the less dense liquid, as additional cementitious plug material is injected into the bore hole from the lower open end of a pipe within the bore hole;

FIG. 4 is a vertical view, similar to FIGS. 1-3, illustrating a cementitious plug material in place within a bore hole with the plug material being squeezed between a more dense liquid and a less dense liquid such that the plug material is compressed during hardening and is forced laterally into contact with the surface of the bore hole;

FIG. 5 is a vertical view, similar to FIG. 1, depicting the application of pressure in a well bore against the upper less dense liquid to increase the force applied to a plug material on its injection at the interface between the lower, higher density liquid and the upper liquid;

FIG. 6 is a vertical view, similar to FIG. 1, illustrating the introduction of a displacing gas into the well bore above the upper liquid with the liquid being withdrawn up a pipe positioned within the well bore;

FIG. 7 is a vertical view, similar to FIG. 6, illustrating a well bore after displacement of the upper liquid by the pressurized gas, with aerated cement being introduced at the interface between the pressurized gas and the lower liquid; and FIG. 8 is a vertical view, similar to FIG. 4, of a cementitious plug material within a well bore being squeezed between the upper presur-ized gas and the lower liquid.

DETAILED DESCRIPTION OF THE INVENTION

As illustrated in FIG. 1, a well bore, generally referred to as 2, may include a cemented or cased portion 4 and an open hole portion 6 which is not cemented or cased. A liquid 8 may be present within the open hole portion 6. In general, the liquid 8 may be seepage liquid from the formation that is forced into the open hole portion 6 due to pressures within the formation. However, if desired and as will be explained, the liquid 8 may be introduced intentionally into the well bore 2.

A pipe 10 may be centrally positioned within the well bore 2 with the pipe having an open lower end positioned adjacent to the surface of the liquid 8. A liquid 12 may be circulated within the well bore 2 in the direction indicated by the arrows 14 with the liquid 12 passing down the pipe 10 and then upward through the annular space between the pipe and the well bore. The upper liquid 12 may have a density which is less than that of the lower liquid 8; thus the liquid 12 will come to rest on top of the liquid 8 within the well bore 2.

As shown alternatively in the phantom line drawing of FIG. 1, the pipe 10 may extend below the surface of liquid 8 as indicated at 10a. A liquid 15 may then be introduced through pipe 10a. Preferably, the liquid 15 has a higher density than the liquid 8 and is discharged below the surface of the liquid 8. The more dense liquid 15 then displaces the liquid 8, with the liquid 15 becoming the lower liquid and the liquid 8 becoming the upper liquid.

Turning to FIG. 2, after circulation of the upper liquid 12, a quantity of the upper liquid is in contact with the liquid 8 at an interface 16. In practicing the method of the present invention, the location of the interface 16 is of great importance since the location of the interface determines the location of the plug that is to be formed within the well bore 2. In circulating the liquid 12, as described, the liquid 12 may displace and entrain a portion of the first liquid 8. Thus, if the surface level of the liquid 8 within the well bore 2 is above the desired location for the plug, a portion of the liquid 8 may be removed to establish the interface 16 at the desired location for formation of the plug. As stated, this may be accomplished by circulating the liquid 12 in such a manner that a portion of the liquid 8 is entrained within the second liquid 12.

Also, as described with reference to FIG. 1, the location of the interface 16 may be controlled by introduction of a more dense liquid 15 to displace the liquid 8 (in this case, there might not be any liquid 12). As liquid 15 is introduced, more and more liquid 8 is displaced and the interface between the liquids 8 and 15 moves upwardly to whatever location is desired within the well bore 2.

As indicated in FIG. 2, an aerated cement slurry or other plug material 18 may be forced down the pipe 10 for injection into the well bore at the interface 16. A variety of plug materials may be used in the practice of the invention, so long as the density of the plug material is intermediate that of the densities of the phases in contact at the interface where the plug material is injected. For example, the plug material may be Portland cement with any of the various additives which are available for mixing with Portland cement, gypsum cement, pozzolanic cement, lightweight cement, expansive cement, or synthetic resins, etc. In injecting the aerated cement 18 or other plug material through the pipe 10, a front separator plug 20 may be placed between the liquid 12 and the aerated cement within the pipe. As indicated by the arrow 22, the aerated cement 18 is moving downwardly within the pipe 10.

Turning to FIG. 3, after injection of a portion of the aerated cement 18 into the well bore 2, the aerated cement floats on the liquid 8 at an interface 24 between the cement and liquid 8. Similarly, the aerated cement 18 contacts the liquid 12 at an interface 26. When the cement 18 is discharged from the lower open end of the pipe 10, the cement may undergo movement in a radially outward direction with respect to the pipe, as indicated by the arrows 28. Also, as the cement 18 is discharged from the pipe 10, the cement displaces a portion of the upper liquid 12 such that the upper liquid is moved upwardly as indicated by the arrows 30. A rear separator plug 32 within the pipe 10 may separate the cement 18 from a pressurized driving fluid 33 which may have a density that is similar to that of liquid 12. The driving fluid 33 exerts a downward force indicated by arrows 34 against the plug 32. This force 34 is transferred to the cement 18 within the pipe 10 such that cement is discharged from the bottom of the pipe as indicated by the arrows 28.

As shown in FIG. 4, after all of the aerated cement 18 has been discharged from the pipe 10, the pipe may be moved upwardly as indicated by the arrow 35; the cement may then flow slightly to fill in the hole left by the withdrawal of the lower end of pipe 10. With the aerated cement 18 in place, an upward buoyant force indicated by arrows 36 will be exerted against the cement by the more dense liquid 8. Similarly, a downwardly-directed gravitational force 38 will be exerted by the less dense liquid 12 against the aerated cement 18. The net result of the downward gravitational force 38 and the upward buoyant force 36 is that the aerated cement 18 will be compressed or squeezed. This stresses the aerated cement 18 or other plug material and removes contaminants by gravity stratification such that the plug material is strengthened to provide a plug having superior strength characteristics. A further benefit of the squeezing of the plug material 18 is that a lateral side force 40 is produced between the cement 18 and the inner surface of the open hole portion 6 which makes the plug move into the fissures in the open hole surface. This produces a better bond between the plug and the surface of the open hole portion 6, such that the plug is more firmly fixed in position within the well bore 2. As will be realized, control of the volume of the liquid 12 and/or the pressure exerted on that liquid can be employed to control the squeezing force exerted upon the plug.

In forming a plug within the well bore 2, it is not necessary that the plug be in contact with the formation as indicated by the contact of the plug material 18 with the open hole portion 6 in FIG. 4. If desired, the plug material 18 may be in contact with the cemented portion 4 of the well bore 2. The formation of the plug at any desired location within the well bore 2 does not change the steps of the method. In any event plug material may be injected at an interface between two phases within the well bore with the plug material having a density that is greater than the density of the phase above the plug material and a density that is less than the density of the phase below the plug material.

Turning now to FIG. 5, which is a vertical view through a well bore, the liquid 12 may be forced into the well bore 2 through an annular space 41 between the pipe 10 and the well bore and pressure may then be applied to the liquid 12 as indicated by the arrows 42. Pressure may be applied to the upper liquid 12 by various means, such as by introducing water above the liquid to apply a hydrostatic head to the upper surface of the liquid. Also, pressure may be applied to the surface of the upper liquid 12 through the introduction of a pressurized gas above the upper liquid. When aerated cement 18 is then injected into the well bore 2 at the interface 16 between the liquid 12 and the liquid 8, the aerated cement is subjected to increased pressure because of the pressure indicated by arrows 42 which is asserted against the surface of the liquid 12. The aerated cement 18 may thus be subjected to increased stress during setting of the cement such that the plug which is formed has greater strength and is more securely bonded to the surface of the open hole portion 6 of the well bore 2.

In the embodiment shown in FIG. 6, the liquid 12 may be displaced from the well bore 2 by introducing a pressurized gas 44 against the surface of the second liquid. The pressurized gas 44 may be introduced into the well bore 2 by any convenient means, as indicated by a pipe 46 having a valve 48 therein to control the flow of pressurized gas. The pressurized gas 44 applies a downward force on the liquid 12 such that the displaced liquid may be withdrawn upwardly through the pipe 10 as indicated by arrows 52.

Turning to FIG. 7, after displacement of the second liquid 12 from the well bore 2 in the manner illustrated in FIG. 6, the pressurized gas 44 then bears against the first liquid 8 at a pressurized gas/first liquid interface 45. Aerated cement 18 may then be introduced into the well bore 2 from the pipe 10 as indicated by arrows 51 with the aerated cement being injected into the well bore at the interface 45.

As illustrated in FIG. 8, after introduction of the aerated cement 18 at interface 45, the aerated cement is subjected to downward pressure from the gas 44 as indicated by arrows 54. Additionally, the aerated cement 18, which has a density less than that of the first liquid 8, is subjected to an upward buoyant force as indicated by the arrows 56. This results in squeezing the aerated cement 18 between the gas 44 and the first liquid such that the aerated cement is compressed during setting so as to increase the compressive strength of the plug after setting of the plug material. As a result of the downward pressure 54 and the upward buoyant force 56, the aerated cement 18 is squeezed to produce outwardly-directed lateral forces indicated by arrows 58 against the surface of the open hole portion 6. The lateral forces 58 applied against the surface of the open hole portion 6 during setting of the cement or other plug material improves the bond between the plug and the surface of the open hole portion which is in contact herewith.

The procedure illustrated in FIGS. 6–8 may also be utilized in forming a plug within a cemented well bore such as portion 4 of the well bore 2. In this instance, the pressurized gas/first liquid interface 45 illustrated in FIG. 7 would be positioned within the cemented portion 4 of the well bore 2. However, the other steps of the method would be the same, the aerated cement 18 or other plug material is injected into the well bore 2 at the interface 45 to form a plug within the cemented portion of the well bore. Again, the pressure of the gas as at 54 may be employed to control compression.

As stated previously, the present method may be used in forming a plug within a dry or a relatively dry well bore, as well as in forming a plug within a well bore that contains standing liquid. With reference to FIGS. 1, 5, and 6, wherein the well bore 2 is dry or relatively dry, the liquid 8 may be intentionally introduced into the well bore, for example through the pipe 10. Following this, the steps described previously may be followed in forming a plug within the well bore 2.

With reference to the foregoing description, essentially any type of fluid may be used to support the plug as the latter is formed in the well bore. For example, the lower fluid may be composed of a liquid solution of chemicals in water and/or oil; water; oil; a slurry of suspended solids in water and/or oil; a fluid which is an aerated mixture of a gas and a liquid; a fluid which is an aerated mixture of a gas and a slurry of suspended solids in a liquid; gases which have been pressurized to form liquids or a mixture of liquids and gas under pressure; etc. Examples of appropriate fluids are lignosulfonate muds, polymer muds, foamed muds, oil muds, emulsion muds, barite muds, bentonite muds, salt water gel muds, gun barrel water, salt water, $CaCl_2$ water, zinc chloride water, packer fluid, KCl water, lease crude oil, formation brine, carbonated water, etc. The densities of these various fluids, which encompass any type of fluid used in drilling, completion, or maintenance of a well, are heavier than the density of the plug material and may lie within the density range at which the particular type of fluid can be created. The type of fluid or its density can be modified if the density range of the fluid is not suitable for forming a plug in accordance with the invention. Generally, the lower fluid may have a density in the range from about 8 pounds per gallon (ppg) to about 22 ppg.

As an example of the lower (higher density) fluid, the fluid may be formed by mixing a portion of a drilling mud in the well bore, having a density of about 14 ppg, with additional barite to form a mud having a density of 15 ppg. The 15 ppg mud may be pumped back into the well bore through the work pipe to fill the well bore with 15 ppg mud to the depth required to support the plug material at the interface with the 14 ppg mud. A plug material having a density of 14.5 ppg may then be pumped into the well bore through the work pipe and introduced at the interface above the 15 ppg mud. If drilling mud above the plug material has a density of 14 ppg, the plug material will form a gravity separation within the well bore between the lower 15 ppg mud and the upper 14 ppg mud. Following this, the work pipe may be removed and the plug permitted to harden.

By way of example, general density ranges for various types of well fluids are set forth to illustrate the choice of fluids for use in the present method.

| TYPE OF WELL FLUID | TYPICAL DENSITY RANGE | |
| --- | --- | --- |
| Oil | 6.5 ppg | to 8.34 ppg |
| Seawater | 8.5 ppg | to 8.6 ppg |
| Fresh water | 8.3356 ppg | to 8.34 ppg |
| Drilling Muds (water base) | 8.6 ppg | to 22 ppg |
| Completion Fluids (no solids) | 6.8 ppg | to 15 ppg |
| Completion Fluids (with solids) | 6.8 ppg | to 21 ppg |
| Foamed Muds | 0.3 ppg | to 8 ppg |

| TYPE OF WELL FLUID | TYPICAL DENSITY RANGE | |
| --- | --- | --- |
| Saltwater | 8.4 ppg | to 10.1 ppg |
| Drilling Muds (oil base) | 7.0 ppg | to 20 ppg |

The more dense fluid positioned below the plug material in the practice of the invention may or may not include additives to prevent loss of the more dense fluid to the formation. In general, lost circulation occurs when the Equivalent Circulating Density (ECD) in the well bore increases a large amount, such as an increase in ECD from 13 ppg to 17 ppg, assuming the latter figure to be the fracturing mud weight (equivalent density) that would fracture that particular formation. The increase in ECD caused by increasing the density of the fluid positioned below the plug material in the performance of the present invention would rarely be more than one ppg (based on a 2 ppg increase in density over approximately one half the true vertical depth of the well). In this instance, the density of the upper fluid positioned above the plug material could be decreased to negate any ECD increase caused by use of the more dense fluid below the plug material. In the event that additives are employed in the more dense lower liquid, the additives may be, for example, any of the following: ground nut shells, mica flakes, plant fibers, celloflakes, gilsonite, perlite, silica sand, sand, ground plastic, sawdust, wood chips, ground paper, plastic strips, ground glass, etc.

In performing the present method, it may or may not be necessary to inject a fluid having a lower density on top of a more dense fluid within the well bore prior to placement of the plug material. If, for example, a fluid is injected into the well bore which has a density that is higher than that of the existing well fluid that is circulated up the well bore, there may be no requirement for adding a less dense fluid to the well bore. This is because the addition of a more dense well fluid to the well bore, as illustrated in phantom line drawing in FIG. 1, may result in displacing the original, less dense well fluid. Thus, the original well fluid will be positioned above the interface with the more dense injected fluid.

A well fluid having a lesser density may, of course, be injected on top of an existing well fluid which has a greater density. The well fluid having a lesser density may be a different type of well fluid than the fluid having the greater density with the density of the less dense fluid being less than that of the plug material and yet within the range of the densities obtainable with the particular fluid that is used. In general, the density of the less dense fluid positioned above the plug material may range between about 6.5 ppg and 20 ppg.

The viscosity of the less dense fluid positioned above the plug material and/or the more dense fluid positioned below the plug material may be adjusted in the practice of the invention by carrying out small-scale tests prior to placement of the plug to determine whether gravity separation occurs between the fluids and the plug material. The viscosities of the well fluids may be adjusted through use of any available means with a change in viscosity normally being performed by changing the density of the well fluid. The viscosities of the well fluid may be changed by adding various materials to the well fluid such as clays, polymers, suspended solids, entrained gases, soluble materials, etc., or by emulsifying the well fluid. In general, well fluids employed in the present invention should not contain solids having large particle sizes and high specific gravities such that the solids would tend to settle out of the fluid.

To eliminate undue mixing of the more dense liquid positioned below the plug material and the less dense liquid positioned above the plug material, the more dense liquid may be injected into existing well fluid in the manner indicated in phantom line drawing in FIG. 1. In this instance, the interface formed between the more dense liquid and the less dense liquid moves up the well bore as more dense liquid is added with there being no direct contact between the interface and the flow existing at the end of the work pipe. The upward movement of the interface in this instance occurs simply as a result of the gravity displacement of existing well fluid by a more dense fluid being injected into the well bore. Interfacial mixing between the more dense and the less dense fluids may also be substantially reduced or eliminated by reason of the different densities of the fluids, their viscosities, and the types of fluids being used. Interfacial mixing may also be substantially reduced by using low pumping rates in the introduction of fluid into the well bore. Also, interfacial mixing may be reduced by using an inverted nozzle positioned at the lower end of the work pipe such that fluid which is introduced is directed upwardly along the sides of the work pipe and not downwardly into a more dense fluid positioned below the end of the work pipe.

As stated, various materials may be used in forming a plug in the practice of the present invention. Materials which may be used in forming a plug include any one or a mixture of Class A to Class J cements; any one or a mixture of Type I to Type V cements, or gypsum cement, high alumina cement, expanded shale cement, or lime-pozzolan cements which are mixed with water to form pumpable slurries which set up hard to form a solid mass. The above cements may be mixed with various additives to decrease their density, to increase the water ratio, or to increase the yield of the cement slurry, such as bentonite, attapulgite, pozzolans fly ash, sodium meta-silicate, diatomaceous earth, gilsonite, perlite, ground plastic, low specific gravity cellular microspheres, water, dispersable resins, and polymers.

The above cements increase the density of the cement slurry, such as barite, dispersing agents which lower the water ratio, hematite, sand, and illmenite. The above cements may also be mixed with additives which control the thickening time and set time of the cement slurry, such as lignosulfonates, sugars, polymers, salt, potassium chloride, calcium chloride, sodium silicates, etc. Many of the above additives may also control the viscosity, permeability, strength, rheology, fluid loss, free water, expansion, gel strength, and chemical and temperature resistance of the cement slurry and/or the set cement. Foaming agents can also be added along with pressurized gases to form aerated cement slurries which have lower densities than non-aerated cement slurries.

Still other materials that may be used in forming a plug in practicing the present invention are epoxy resins, phenolformaldehyde resins, polyester resins, or other plastics which are pumpable fluids that set to form a hard solid. The resin may be also mixed with perlite, ground plastic, low specific gravity cellular microspheres, plastic beads, and gilsonite to lower the density of the resin slurries. The resins may be mixed with silica sand, silica flour, sand, glass beads, hematite, illmenite, calcium carbonate, fly ash, and barite to increase the density of the present slurries. Additionally, gases may be entrained in the resin slurries to lower their density.

The pumping rates used in placing any of the aforementioned fluids within the well bore, or in placing the plug material within the well bore are of importance in the practice in the present invention, and particularly so when the work pipe has a small diameter. In general, a low pumping rate should be used due to the high friction pressures which are encountered in the use of a small diameter work pipe. Also, a low pumping rate should be used to prevent erosion of the formation when the plug is formed in an open hole and to prevent interfacial mixing.

In general, the flow rates used in the practice of the invention may be about ten feet per second or less when the work pipe has a diameter of 2" or larger if the more dense and less dense fluids and the plug material are generally immiscible, if the interface between the less dense and more dense liquids moves away from the end of the work pipe as fluid is being injected, or if injected fluid from the work pipe is injected through an inverted nozzle positioned at the lower end of the work pipe, as described.

In other situations it is preferable to use a flow rate of about five feet per second or less to prevent interfacial mixing. This may be the case, for example, when the more dense and less dense fluids and/or the plug material are relatively miscible, if the work pipe has an outside diameter that is less than two inches, if a straight open-ended work pipe is used (without an inverted nozzle at its lower end), or if the interface between the more dense and the less dense fluids is positioned at the end of the work pipe.

Having now reviewed this detailed description and the drawings, those skilled in the art will realize that the present invention may employ a wide variety of materials, pumping rates, pipe sizes, and/or process step variations within the scope of the following claims.

I claim:

1. A method for forming a plug within a well bore, said method comprising the steps of:
   establishing a two-phase system within the well bore in which a less dense phase bears against the upper surface of a more dense phase to provide an interface between the two phases that is positioned at a desired location for formation of a plug within the well bore;
   injecting a hardenable plug material at about the interface between the two phases with the plug material having a density which is intermediate the densities of the less dense and more dense phases;
   permitting the plug material to harden to form a plug within the well bore, whereby the plug material floats on the more dense phase during hardening as the plug material is squeezed between the less dense and more dense phases such that the plug material is compressed and is forced into contact with the surface of the well bore to bond securely to the well bore surface; and
   wherein the more dense phase is a more dense liquid and the less dense phase is a less dense liquid which floats on the more dense liquid at the interface between the two liquids before injection of the plug material.

2. The method of claim 1, wherein the amount the plug material is compressed does not increase the density of the plug material to a density greater than the density of the more dense lower phase except when the bottom portion of the plug material is set hard to support the compression of the upper portion of the plug material to form a superior strength high density plug.

3. The method of claim 1 wherein the plug material comprises a cement.

4. The method of claim 1 wherein the more dense liquid is injected below the surface of the less dense liquid within the well bore such that mixing of the more dense liquid and the less dense liquid at the interface between the liquid is minimized.

5. The method of claim 1 wherein the plug material comprises a plastic.

6. The method of claim 1 wherein the hardenable plug material is injected at about the interface between the less dense and the more dense liquids by forcing the plug material through a pipe having a lower open end positioned adjacent to the said interface.

7. The method of claim 6 wherein
   the hardenable plug material is forced through the pipe within the well bore by pressurizing the pipe above the plug material with a liquid having a density similar to that of the less dense liquid.

8. The method of claim 1 including the step of:
   applying pressure to the less dense liquid to increase the pressure against the plug material during hardening.

9. The method of claim 1 including the step of:
   injecting the more dense liquid into the well bore with the more dense liquid displacing less dense liquid within the well bore such that the interface between the more dense liquid and the less dense liquid moves upwardly to a desired location for formation of a plug within the well bore as the more dense liquid is injected into the well bore.

10. A method for forming a plug within a well bore, said method comprising:
    establishing a two-phase system within the well bore in which a pressurized gas injected into the well bore exerts a pressure against the upper surface of a lower liquid to provide a gas-liquid interface at a desired location for formation of a plug within the well bore;
    injecting a hardenable plug material into the well bore at about the location of the gas-liquid interface with the plug material having a density which is intermediate the densities of the gas and the lower liquid within the well bore; and
    permitting the plug material to harden to form a plug within the well bore, whereby the plug material floats on the lower liquid within the well as the plug material is squeezed between the gas and the lower liquid such that the plug material is compressed and is forced into contact with the surface of the well bore to bond securely to the well bore surface.

11. The method of claim 10 wherein the amount the plug material is compressed does not increase the density of the plug material to a density greater than the density of the more dense lower phase except when the bottom portion of the plug material is set hard to support the compression of the upper portion of the plug material to form a superior strength high density plug.

12. The method of claim 10 including the steps of
    circulating an upper liquid within the well bore prior to the injection of pressurized gas into the well bore to establish an interface between the lower and upper liquids that is positioned at a desired location for formation of a plug within the well bore;

said upper liquid having a density which is less than the density of the lower liquid within the well bore such that the upper liquid is positioned above the lower liquid; and injecting the pressurized gas into the well bore to displace the upper liquid from the well bore such that the interface between the upper and lower liquids is replaced by a gas-liquid interface between the pressurized gas and the lower liquid.

13. The method of claim 10 wherein the plug material comprises cement.

14. The method of claim 10 wherein the plug material comprises a plastic.

15. The method of claim 10 including the steps of injecting a more dense liquid into the well bore prior to injecting the pressurized gas, with the more dense liquid injected at a point below the surface of a liquid within the well bore and with the more dense liquid displacing the liquid in the well bore, such that the more dense liquid becomes the lower liquid and the liquid within the well bore becomes the upper liquid;

continuing to inject the more dense liquid until the interface between said lower and upper liquids is positioned at a desired location for formation of a plug within the well bore; and injecting the pressurized gas into the well bore to displace the upper liquid from the well bore such that the interface between the upper and lower liquids is replaced by a gas-liquid interface between the pressurized gas and the lower liquid.

16. A method for forming a plug within a well bore, said method comprising the steps of:

establishing a two-phase system within the well bore in which a less dense phase bears against the upper surface of a more dense phase to provide an interface between the two phases that is positioned at a desired location for formation of a plug within the well bore;

injecting a hardenable plug material at about the interface between the two phases with the plug material having a density which is intermediate the densities of the less dense and more dense phase;

permitting the plug material to harden to form a plug within the well bore, whereby the plug material floats on the more dense phase during hardening as the plug material is squeezed between the less dense and more dense phases such that the plug material is compressed and is forced into contact with the surface of the well bore to bond securely to the well bore surface; and wherein the more dense phase is a liquid and the less dense phase is a pressurized gas which contacts the upper surface of the liquid at a gas-liquid interface before injection of the plug material.

17. A method for forming a plug within a well bore, said method comprising the steps of:

establishing a two-phase system within the well bore in which a less dense phase bears against the upper surface of a more dense phase to provide an interface between the two phases that is positioned at a desired location for formation of a plug within the well bore;

injecting a hardenable plug material at about the interface between the two phases with the plug material having a density which is intermediate the densities of the less dense and more dense phases;

permitting the plug material to harden to form a plug within the well bore, whereby the plug material floats on the more dense phase during hardening as the plug material is squeezed between the less dense and more dense phases such that the plug material is compressed and is forced into contact with the surface of the well bore to bond securely to the well bore surface;

wherein the more dense phase is a more dense liquid and the less dense phase is a less dense liquid which floats on the more dense liquid at the interface between the two liquids before injection of the plug material; and circulating the less dense liquid within the well bore to displace more dense liquid in positioning the interface between the less dense and more dense liquids at a desired location for formation of a plug within the well bore prior to the injection of the hardenable plug material at about the interface between the more dense liquid and the less dense liquid.

18. A method for forming a plug within a well bore, said method comprising the steps of:

establishing a two-phase system within the well bore in which a less dense phase bears against the upper surface of a more dense phase to provide an interface between the two phases that is positioned at a desired location for formation of a plug within the well bore;

injecting a hardenable plug material at about the interface between the two phases with the plug material having a density which is intermediate the densities of the less dense and more dense phases;

permitting the plug material to harden to form a plug within the well bore, whereby the plug material floats on the more dense phase during hardening as the plug material is squeezed between the less dense and more dense phases such that the plug material is compressed and is forced into contact with the surface of the well bore to bond securely to the well bore surface;

wherein the more dense phase is a more dense liquid and the less dense phase is a less dense liquid which floats on the more dense liquid at the interface between the two liquids before injection of the plug material;

circulating the less dense liquid within the well bore to displace more dense liquid in positioning the interface between the less dense and more dense liquids at a desired location for formation of a plug within the well bore prior to the injection of the hardenable plug material at about the interface between the more dense liquid and the less dense liquid; and wherein the less dense liquid is circulated downwardly through a pipe positioned within the well bore with the less dense liquid returning upwardly through the annular space between the well bore and the exterior surface of the pipe.

19. A method for forming a plug within a well bore, said method comprising the steps of:

establishing a two-phase system within the well bore in which a less dense phase bears against the upper surface of a more dense phase to provide an interface between the two phases that is positioned at a desired location for formation of a plug within the well bore:

injecting a hardenable plug material at about the interface between the two phases with the plug material having a density which is intermediate the densities of the less dense and more dense phases;

permitting the plug material to harden to form a plug within the well bore, whereby the plug material floats on the more dense phase during the hardening as the plug material is squeezed between the less dense and more dense phases such that the plug material is compressed and is forced into contact with the surface of the well bore to bond securely to the well bore surface;

wherein the more dense phase is a more dense liquid and the less dense phase is a less dense liquid which floats on the more dense liquid at the interface between the two liquids before injection of the plug material;

circulating the less dense liquid within the well bore to displace more dense liquid in positioning the interface between the less dense and more dense liquids at a desired location for formation of a plug within the well bore prior to the injection of the hardenable plug material at about the interface between the more dense liquid and the less dense liquid;

wherein the less dense liquid is circulated downwardly through a pipe positioned within the well bore with the less dense liquid returning upwardly through the annular space between the well bore and the exterior surface of the pipe; and wherein the less dense liquid is directed away from said interface as the less dense liquid is discharged from the pipe.

20. A method for forming a plug within a well bore, said method comprising the steps of:

establishing a two-phase system within the well bore in which a less dense phase bears against the upper surface of a more dense phase to provide an interface between the two phases that is positioned at a desired location for formation of a plug within the well bore;

injecting a hardenable plug material at about the interface between the two phases with the plug material having a density which is intermediate the densities of the less dense and more dense phases;

permitting the plug material to harden to form a plug within the well bore, whereby the plug material floats on the more dense phase during hardening as the plug material is squeezed between the less dense and more dense phases such that the plug material is compressed and is forced into contact with the surface of the well bore to bond securely to the well bore surface;

the more dense phase is a more dense liquid and the less dense phase is a less dense liquid which floats on the more dense liquid at the interface between the two liquids before injection of the plug material;

circulating the less dense liquid within the well bore to displace more dense liquid in positioning the interface between the less dense and more dense liquids at a desired location for formation of a plug within the well bore prior to the injection of the hardenable plug material at about the interface between the more dense liquid and the less dense liquid;

wherein the less dense liquid is circulated downwardly through an annular space between the well bore and the exterior surface of the pipe positioned within the well bore with the less dense liquid returning upwardly through the pipe.

* * * * *